United States Patent
Klenk (10) Patent No.: US 11,874,847 B2
(45) Date of Patent: Jan. 16, 2024

(54) METHOD FOR GENERATING PROCESS PROTOCOLS IN A DISTRIBUTED IT INFRASTRUCTURE

(71) Applicant: Celonis SE, Munich (DE)

(72) Inventor: Martin Klenk, Munich (DE)

(73) Assignee: CELONIS SE, Munich (DE)

( * ) Notice: Subject to any disclaimer, the term of this patent is extended or adjusted under 35 U.S.C. 154(b) by 757 days.

(21) Appl. No.: 16/942,851

(22) Filed: Jul. 30, 2020

(65) Prior Publication Data
US 2020/0356576 A1    Nov. 12, 2020

Related U.S. Application Data

(63) Continuation of application No. PCT/EP2018/052245, filed on Jan. 30, 2018.

(51) Int. Cl.
*G06F 16/25* (2019.01)
*G06F 11/30* (2006.01)
(Continued)

(52) U.S. Cl.
CPC ......... *G06F 16/254* (2019.01); *G06F 11/302* (2013.01); *G06F 11/3006* (2013.01);
(Continued)

(58) Field of Classification Search
CPC ........ H04L 41/045; H04L 67/34; G06F 17/40
See application file for complete search history.

(56) References Cited

U.S. PATENT DOCUMENTS 9,286,329 B2    3/2016  Svarovsky et al.
9,325,576 B2    4/2016  Edwards
(Continued)

FOREIGN PATENT DOCUMENTS

EP    3040857 A1    7/2016
EP    3 139 272 A1  3/2017

OTHER PUBLICATIONS

International Search Report issued for corresponding International Patent Application No. PCT/EP2018/052245 dated Jan. 7, 2019.
(Continued)

*Primary Examiner* — Kostas J Katsikis
(74) *Attorney, Agent, or Firm* — Myers Wolin, LLC (57) ABSTRACT

A method is provided for generating process protocols from process data in an IT system with at least one extraction node, at least one storage node, and at least one transformation node. The process may be stored in a client system of the IT system. An application catalog is run on a server system of the IT system, and application templates are managed using the application catalog, each application template having an installation program and configuration data. The installation program is used to instantiate, configure, and run each application template on the server system as an application. The applications being run are monitored and managed by a runtime component on the server system, and the process protocols are ascertained according to a number of control instructions run on nodes, the configuration data of each application comprising information on which control instructions are run on which nodes.

16 Claims, 3 Drawing Sheets

(51) Int. Cl.
*G06Q 10/06* (2023.01)
*G06F 17/40* (2006.01)
*G06Q 10/063* (2023.01)
*G06F 13/38* (2006.01)
*H04L 67/00* (2022.01)
*H04L 41/045* (2022.01)

(52) U.S. Cl.
CPC .......... *G06F 11/3065* (2013.01); *G06F 13/38* (2013.01); *G06F 17/40* (2013.01); *G06Q 10/063* (2013.01); *H04L 41/045* (2022.05); *H04L 67/34* (2013.01); *G06F 2201/865* (2013.01)

(56) References Cited

U.S. PATENT DOCUMENTS

| | | | |
|---|---|---|---|
| 10,169,407 B2 | 1/2019 | Rinke et al. | |
| 2003/0177254 A1* | 9/2003 | Baker | H04L 9/40 709/250 |
| 2014/0040182 A1 | 2/2014 | Gilder et al. | |
| 2017/0068702 A1* | 3/2017 | Rinke | G06F 16/22 |
| 2017/0070393 A1* | 3/2017 | Rinke | H04L 41/12 |
| 2017/0228229 A1 | 8/2017 | Jain et al. | |

OTHER PUBLICATIONS

Luis M Vaquero et al., "Towards Runtime Reconfiguration of Application Control Policies in the Cloud," Journal of Network and Systems Manangement, Kluwer Academic Publishers—Plenum Publishers, NE, Aug. 8, 2012, pp. 489-512, vol. 20, No. 4.

Written Opinion of the International Searching Authority issued for corresponding International Patent Application No. PCT/EP2018/052245, dated Jan. 7, 2019.

Notice of Reasons for Rejection issued by the Japan Patent Office for corresponding Japanese Patent Application No. 2020-539053, dated Sep. 27, 2021, with an English translation.

* cited by examiner

METHOD FOR GENERATING PROCESS PROTOCOLS IN A DISTRIBUTED IT INFRASTRUCTURE

CROSS REFERENCE TO RELATED APPLICATIONS

This application is a continuation of International Application No. PCT/EP2018/052245, filed on Jan. 30, 2018, the contents of which are incorporated by reference herein.

TECHNICAL FIELD

The invention relates to a method for generating process protocols in a distributed IT infrastructure.

BACKGROUND

It is known to analyze processes that are run on a computer system or using a computer system. In this context, a process may comprise a plurality of process steps. Generally speaking, each process step generates data that are stored in the computer system. Information that is relevant for analyzing the processes can be extracted from these stored data. The processes may also be commercial processes. In this way, the transactions stored in an ERP system can be analyzed, for example. However, the processes may also be technical processes.

In this context, the processes are analyzed in the source system, in other words in the computer system in which the data are generated and stored. A drawback of this is that only processes that are run on the source system in question can be analyzed. A further drawback of this is that, depending on the data volume, process analysis may be very CPU-intensive, and so in many cases analysis cannot be performed efficiently if the source system does not have corresponding resources available.

To take account of this drawback, the processes may also, alternatively, be analyzed in a different computer system (also referred to hereinafter as a server system) that does have corresponding resources available. For this purpose, the data that are generated by the processes being run on and stored in the source system (also referred to hereinafter as a client system) are initially transferred from the source system to the server system. In this way, processes that are run on different source systems can still be analyzed in the server system.

One drawback of this is that all data that belong to the processes to be analyzed have to be transferred to the server system. Thus, data that are not required for the analyses are also transferred unnecessarily, since in many cases the source system has no information as to which data of the processes to be analyzed the server system specifically requires.

In addition, the reliability of the communications connection between the source system and the server system is predominantly determined by the available communications protocols. The transfer rate is predominantly determined by the bandwidth of the communications connection.

On the other hand, the transfer of the data is associated with considerable outlay if the server system cannot access the source system directly. In this case, the data initially have to be exported in the source system and subsequently imported to the server system. The provisioning or configuration of the source systems or client systems that is required for this purpose is technically complex and elaborate, in particular if the client systems and server systems on which the process analysis is run are associated with different organizations. If for example a service provider runs the process analysis for a number of customers, each customer has to run the provisioning, which is required for the data transfer, of the associated client system. In this context, ad hoc process analyses are no longer possible or at best are made much more difficult.

Therefore, it is an object of the invention is to provide solutions that enable simpler, more efficient analysis of processes run on different computer systems.

SUMMARY

This object may be achieved according to the invention by a method according to the independent claim. Advantageous implementations and developments of the invention are set out in the dependent claims.

Accordingly, the invention relates to a method for generating process protocols from process data in an IT system with at least one extraction node, at least one storage node, and at least one transformation node, said process data being stored in at least one client system of the IT system, wherein an application catalog is run on a server system of the IT system, and
a number of application templates are managed using the application catalog, each application template comprising an installation program and configuration data, wherein
the installation program is used to instantiate, configure, and run each application template on the server system as an application,
the applications being run are monitored and managed by a runtime component which is run on the server system, and
the process protocols are ascertained from the process data according to a number of control instructions which are run on the nodes, the configuration data of each application comprising information on which control instructions are run on which node.

Using the application catalog, simple provisioning or configuration of a distributed IT infrastructure, consisting of a server system and a number of client systems, is made possible, so as to generate process protocols from process data that are stored in the number of client systems. For each customer or for each client system, at least one application is run on the server system. Each application is configured in a customer-specific or client-specific manner, in accordance with predetermined customer settings, which may be part of the configuration data. Since the configuration data (for example address of the client system, authorization processes, passwords, language settings, etc.) are assigned to a specific application (specific instance of an application template) and thus to a specific client system (customer), and specify the configuration data as to which control instructions are run on which node (extraction node, storage node, transformation node), instantiation of an application enables client-specific or customer-specific provisioning of the distributed IT infrastructure in a particularly technically simple manner. For example, by way of the configuration it may be established that the extraction node is run on the client system and the storage and transformation node are run on the server system.

On the one hand, this makes it possible for the customer to link the customer-specific IT infrastructure into the distributed IT infrastructure without further configuration. On the other hand, the customer benefits from optimized transfer protocols between the client system, extraction node and storage node without having to make changes in the IT infrastructure for this purpose.

As a result of the abstraction of the distributed extraction nodes, the same extraction infrastructure can be used so as to be able to process all applications instantiated by the customer and the extraction of said applications.

The at least one client system may be connected to the server system via a communications network, the process data being generated by running at least one process on the at least one client system and being stored in the client system, and being a part of source data stored in the client system, the process data comprising data of a number of process instances, the data of a process instance representing a process that is run on the client system and that comprises a number of process steps.

A client system is a computer system for example of a customer of a service provider who runs the process for the customer. A server system is a computer system for example of the service provider. The server system may be a cloud computing system. The client systems may also be cloud computing systems. The client systems and server system together form the distributed IT infrastructure (IT system) consisting of the extraction node, storage node and transformation node.

It is advantageous if
a first extraction node is run on at least one client system,
at least one transformation node and at least one storage node are run on the server system,
the first extraction node extracts the process data from the source data stored in the client system in accordance with the control instructions and transfers the extracted process data to the storage node of the server system,
the storage node receives the extracted process data from the extraction node and stores them in a storage device of the server system, and
the transformation node generates the process protocol from the process data stored in the storage device in accordance with the control instructions and transfers the generated process protocol to the storage nodes for storage in the storage device.

By running the first extraction node on the client system, the client system is linked into the distributed IT infrastructure. The first extraction node, which is run on the client system, is controlled using the control instructions, it being established by the application, which is assigned to the client system and run on the server system, which control instructions are run on the first extraction node.

The extraction of the process data on the client system and the transfer of the extracted process data to the storage node of the server system are thus controlled by a corresponding application, which is in turn monitored by the runtime component of the server system. Since the first extraction node run on the client system is controlled by the corresponding application on the server system, it is additionally possible for only the process data that are actually required for analyzing the process data to be extracted from the source data in the client system—this prevents data that are not required for the analysis from being transferred from the client system to the server system.

In this context, it is advantageous that, for linking the client system into the distributed IT infrastructure, an application from the application catalog has to be instantiated and the corresponding node of the client system (for example an extraction node) has to be run.

In this context, it is also advantageous that the communication path from the client system to the extraction node (if the extraction node is run on the client system) is significantly shortened, and an optimum communications protocol and compression method can be selected for transferring the data to the storage node of the server system. This prevents dependency on communications protocols and exchange formats provided by the client system.

A legacy database is one possible example of a client system whose connection does not support compression. By installing an extraction node in the client system, the efficient network within the customer infrastructure of the client system can be used to establish a connection to the legacy database. In the extraction node, the database can then be packetized and compressed, and subsequently transmitted to the storage node of the server system via a less efficient WAN.

The first extraction node can specify which communications protocol is used for transferring the extracted process data to the storage node of the server system.

The first extraction node can prepare, in particular optimize and/or compress, the extracted process data before the extracted process data are transferred to the storage node of the server system.

It is advantageous for the server system to be usable jointly by a plurality of client systems.

It is additionally advantageous if the transformation node generates the process protocol in accordance with a predetermined data structure, the predetermined data structure comprising at least:
a first attribute, in which a unique identifier of the process instance of the associated process step is stored,
a second attribute, in which an identifier of the associated process step is stored, and
a third attribute, in which an order of the process steps within a process instance is stored,
wherein, in the data structure, the storage node stores the process steps associated with a process instance in the storage device, sorted by the third attribute.

In this context, it is in particular advantageous if the process steps associated with a process instance are stored in the storage device at adjacent addresses, sorted by the third attribute. As a result, processing of the process data as a stream can be enabled in the process analysis.

The control instructions may comprise at least one extraction instruction that is sent to the first extraction node by the runtime component, the at least one extraction instruction prompting the first extraction node to extract predetermined process data from the source data and to transfer the extracted process data to the storage node of the server system.

The first extraction node may be adapted to register itself with the runtime component in such a way that the runtime component can uniquely assign the registered first extraction node to a client system.

In one embodiment of the invention, at least one second extraction node may be run on the server system, and may extract process data from the source data stored in the at least one client system in accordance with the at least one extraction instruction sent from the runtime component to the second extraction node and transfer the extracted process data to the storage node of the server system.

The runtime component may send the at least one extraction instruction to the first extraction node or to the second extraction node as a function of the associated client system in which the source data are stored.

The extracted process data and the process protocols may each be encrypted using a key assigned to the associated client system, the key being generated when the application is configured for the associated client system.

The extracted process data and the process protocols may be distributed over a plurality of storage nodes.

The control instructions may comprise at least one transformation instruction, which is sent from the runtime component to the at least one transformation node, the at least one transformation instruction prompting the associated transformation node to generate the process protocol from predetermined process data.

The at least one transformation instruction may be run on a plurality of transformation nodes in parallel.

BRIEF DESCRIPTION OF THE DRAWINGS

Details and features of the invention and specific implementations of the invention will be apparent from the following description, in connection with the drawings, in which.

DETAILED DESCRIPTION

Figure 1:
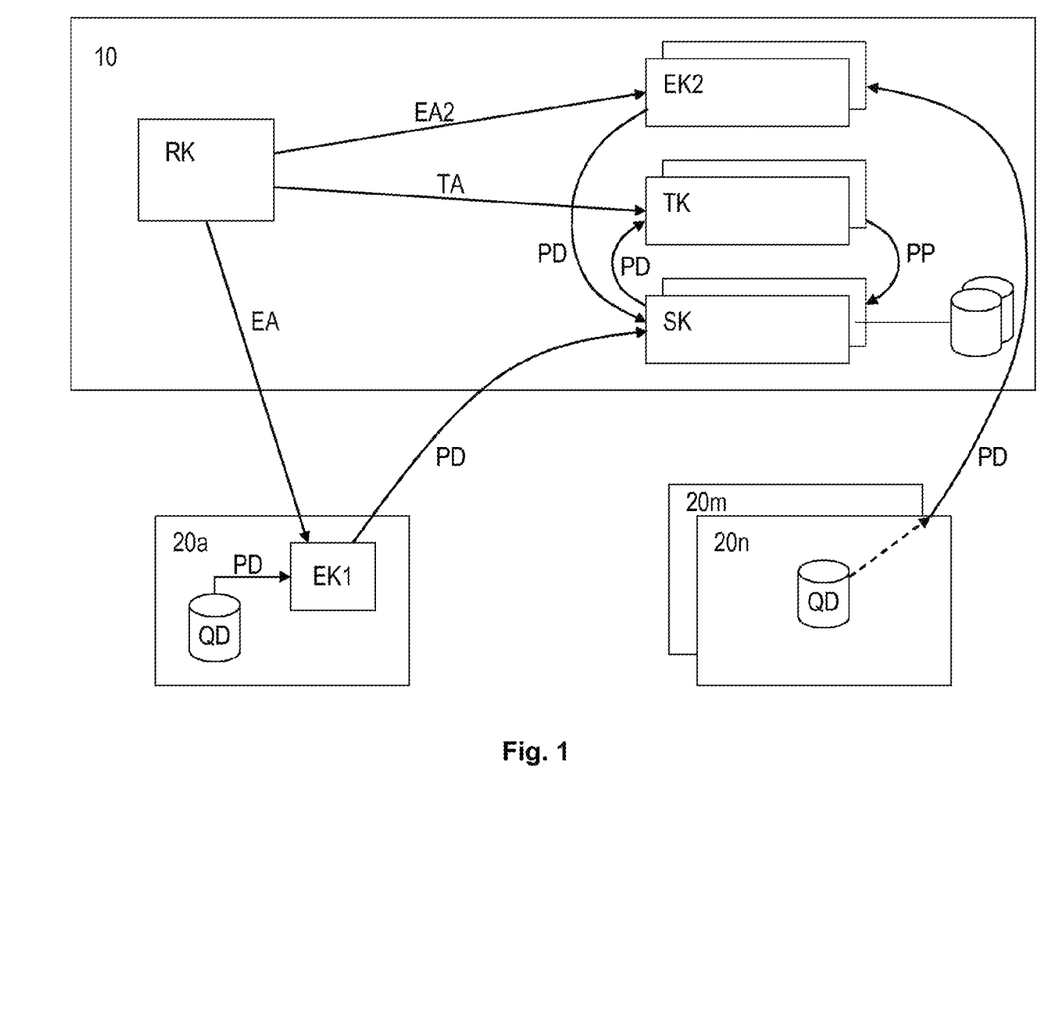
FIG. 1 is a block diagram of an IT infrastructure, describing a method according to the invention for generating process protocols in a distributed IT infrastructure.
Figure 2:
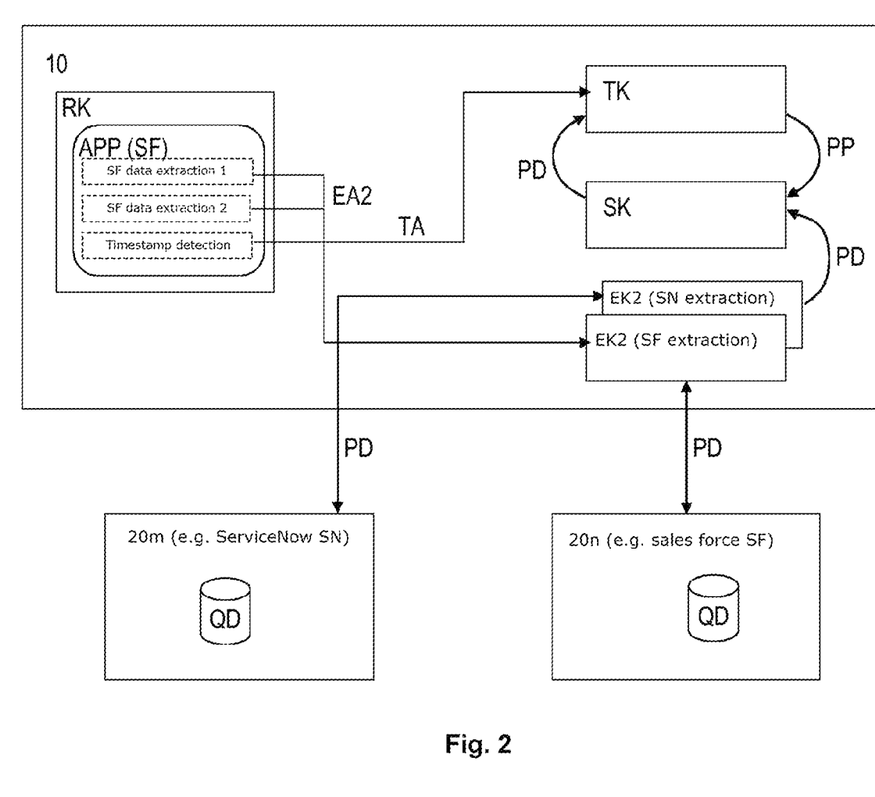
FIG. 2 is a block diagram of a specific example of an IT infrastructure, in which the extraction node is run on the server system.
Figure 3:
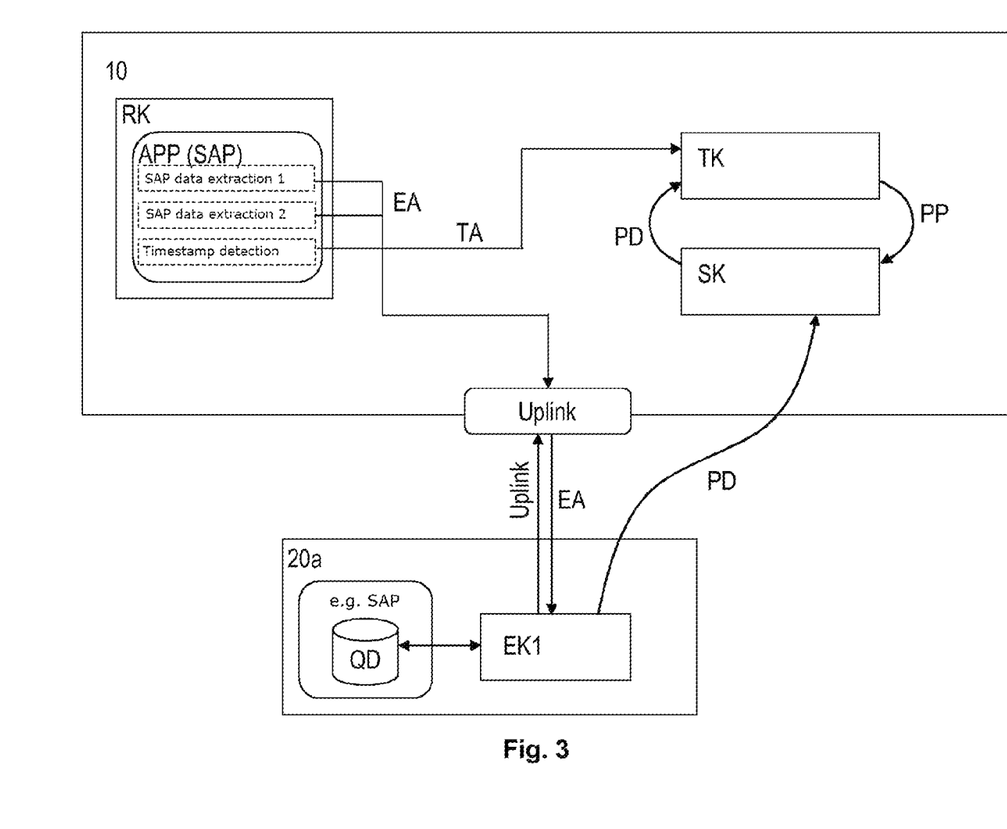
FIG. 3 is a block diagram of a specific example of an IT infrastructure, in which the extraction node is run on the client system.

FIG. 1, FIG. 2 and FIG. 3 are each a block diagram of an IT system according to the invention. In each case, the IT system is implemented as a distributed infrastructure and comprises a server system 10 and at least one client system, a plurality of client systems 20a to 20n being shown in FIG. 1 and FIG. 2.

The client systems 20a to 20n are connected to the server system 10 via a communications network (not shown here). The communications network may for example be the Internet.

The client systems may each comprise a computer system having a storage device and a data processing device. In this case, the client systems are each assigned to a particular company. The client systems may each be a cloud computing system.

The server system comprises a computer system having a storage device and a data processing device, it being possible for a plurality of distributed storage devices and a plurality of distributed data processing devices to be provided. In one implementation of the invention, the server system 10 is a cloud computing system, by means of which a particular IT infrastructure, such as storage space and processing power, is provided.

In the present example, the server system is assigned to a service provider who runs a process analysis for a plurality of customers. The client systems are each assigned to a customer of the service provider.

The client systems 20a to 20n may use the server system 10 jointly and virtually simultaneously. In this connection, the server system 10 is also referred to as a shared infrastructure. To "use jointly" means that the client systems can jointly use both the storage space and the processing power of the server system or that the server system enables joint usage of the storage space and processing power by a plurality of client systems.

At the companies (in other words at the customers), commercial processes or technical processes are run. These commercial processes or technical processes are run in whole or in part using the associated client system. Examples of a commercial process are for example order processing, procurement processes or the like. A commercial process generally consists of a plurality of commercial process steps. A commercial process that is being run is referred to as a commercial process instance. An example of a technical process is for example the assembly of a motor vehicle, in which it is detected using sensors which parts are installed when. A technical process of this type may consist of a plurality of process steps.

Commercial processes and technical processes are jointly referred to as processes hereinafter. A process that is being run is referred to as a process instance hereinafter. The steps of a process or of a process instance are also referred to as process steps hereinafter. The process steps are uniquely assigned to a process instance.

When processes of this type are run on the client systems, data accrue in the client systems and are stored in the client systems. These data are referred to as a whole as source data.

Process data, which describe the actual commercial processes or technical processes being run, are a part of the source data. The process data include for example the start and end time of an invoicing process or the date of a receipt of payment. By contrast, the VAT number in an invoicing process may be part of the source data of the commercial process that is specifically being run, but is not part of the process data. In technical processes, the process data may include for example the time of assembly and an identifier of the work who performs the assembly.

Process data refers to the data, of the process instances that are being run, that are relevant for analyzing the processes that are being run.

Each process instance generates its own process data in the associated client system.

Using the distributed IT infrastructure shown here and the methods described herein, it is now possible to analyze, in an efficient and resource-saving manner, process data that accrue in a plurality of client systems when processes are run and that are stored in the client systems, and in particular to generate from these process data, in an efficient and resource-saving manner, process protocols that can be used as a basis for efficient analysis of the processes that are being run. In addition, simple provisioning of the client systems is enabled so as to link the client systems into the distributed IT infrastructure.

According to the method, the process protocols are generated in the server system and made available by the server system to a process mining system for analyzing the processes. In this context, the process mining system may itself be a part of the server system.

For generating the process protocols from the process data generated and stored in the client systems, the process data initially have to be extracted from the source data of the client systems. The process protocols can subsequently be generated from the extracted process data.

The extraction of the process data from the source data and the generation of the process protocols from the extracted process data are implemented using extraction nodes or transformation nodes, as described hereinafter.

In relation to the client systems, the method distinguishes between
 client systems in which the server system 10 can access the source data directly (for example via particular APIs (application-program interfaces)) and
 client systems in which the server system 10 does not have direct access to the source data.

By way of example, in the distributed IT infrastructure shown in FIG. 1, the server system cannot access the source data of the client system 20a directly, whereas direct access to the source data of the client systems of the client systems 20m, 20n is possible.

In the specific example of a distributed IT infrastructure shown in FIG. 2, the server system 10 can access the source data of the client systems 20m and 20n directly. The client system 20n may for example be a sales force system (SF). The client system 20m may for example be a ServiceNow system (SN).

In the specific example of a distributed IT infrastructure shown in FIG. 3, the server system 10 cannot access the source data of the client system 20a, which may for example be an SAP system (SAP), directly.

In order for the process data of the client system 20a (to which the server system 10 does not have direct access) still to be available for the generation of the process protocols by the server system, the method provides that a first extraction node EK1 is provided in the client system 20a and run on the client system 20a. The first extraction node EK1 is adapted to extract the process data stored in the client system 20a from the source data QD of the client system 20a and to transfer the extracted process data PD to the server system 10. This ensures that the server system still does not have access to the source data of the client system 20a. On the other hand, it is made possible for the process data required for generating the process protocols to be able to be made available to the server system.

The process data are extracted from the source data by the first extraction node EK1 in accordance with predetermined rules, which specify which data are to be extracted from the source data QD in what form. For example, the rules may specify that process data are only to be extracted from source data that were generated in the client system 20a within a particular timeframe.

These predetermined rules may be made available to the first extraction node EK1 by a runtime component RK, which is run on the server system 10, as part of an extraction instruction EA or as part of a plurality of extraction instructions EA. Via an uplink (see FIG. 3), which uses for example the Web Socket protocol, between the server system 10 and the first extraction node EK1, the extraction instructions EA are transferred to the first extraction node EK1.

The process data PD extracted by the first extraction node EK1 are transferred to a storage node SK of the server system 10. The storage node SK is run on the server system 10 and is adapted to receive the process data PD transferred from the first extraction node EK1 and to store them in a storage device assigned to the storage node SK.

Before the process data PD are transferred, they may be prepared by the first extraction node EK1. For example, the extracted process data may be optimized and/or compressed to enable optimized transfer of the process data from the client system 20a to the server system 10. In addition or alternatively, the extracted process data may be converted to a predetermined data structure before the transfer. The (optionally prepared) process data PD may be transferred via the uplink to the storage node SK. Alternatively, as is shown in FIG. 3, the process data PD may be transferred, via a connection expressly set up for this purpose, between the extraction node EK1 and the storage node SK, for example using the http protocol.

Once the extracted process data PD are transferred to the storage node SK, they are available in the server system 10 for generating one or more process protocols PP.

For generating the process protocols, at least one transformation node TK is provided, which is run on the server system 10 and is adapted to generate one or more process protocols PP from the process data stored in the storage node SK and to transfer the generated process protocols to the storage node SK for storage.

According to the method the process protocols PP are generated by the transformation node TK in accordance with a predetermined data structure. The predetermined data structure comprises at least:

a first attribute, in which a unique identifier of the process instance of the associated process step is stored, a second attribute, in which an identifier of the associated process step is stored, and a third attribute, in which an order of the process steps within a process instance is stored.

The first attribute is a unique identifier of a process instance (for example a specific commercial process instance). The second attribute describes a process step of a process instance—this may be a unique identifier of the process step or a description of the process step. The third attribute specifies the order of the process steps within a process instance.

By means of the first attribute, all of the process steps are assigned to a specific process instance. In one embodiment of the invention, the first attribute may also be a composite unique identifier (composite key).

In general, the third attribute specifies the order of the process steps within a process instance. In one embodiment of the invention, a timing (date/time) may be stored, which specifies at what time the corresponding process step was run. The use of timings (timestamps) has the advantage that time-based analyses can be carried out using them and the process steps of a process instance can still be sorted.

The method provides sorting the process protocol or the datasets stored therein, initially by the first attribute and subsequently by the third attribute, and storing the data structure in the storage device in this grouping or sorting by way of the storage node SK. In this context, it is advantageous if the process steps in the storage device that are consecutive in the sorting are stored in adjacent storage addresses. It is further advantageous if the storage device is the working memory.

Sorting the process steps within a process instance and storing them adjacently, as explained above, has the advantage that the process instances are present in grouped form. As a result, the process steps in a stream can be read from the storage device and processed sequentially and in the correct order. In addition, a precursor/successor relationship of the process steps within a process instance can be calculated.

An example of a process protocol is set out hereinafter.

| First attribute | Second attribute | Third attribute |
| --- | --- | --- |
| 1 | Create PO | 08:00 |
| 1 | Shipping | 10:00 |
| 1 | Payment | 11:00 |
| 2 | Create PO | 08:00 |
| 2 | Approve PO | 08:15 |
| 2 | Shipping | 08:30 |
| 2 | Payment | 09:00 |

The process protocol can be stored in the storage device in columns.

Moreover, a second extraction node EK2, which is run on the server system 10 and which is adapted to extract process data PD from source data QD of the client systems 20m, 20n that the server system can access directly, may be provided in the server system. The remaining functionality of the second extraction node EK2 corresponds to that of the first extraction node EK1; in other words, the process data PD extracted from the second extraction node EK2 are passed to the storage node SK for storage (and potentially prepared in advance). In this context, the second extraction node EK2 may use special APIs of the client systems 20m, 20n to access the source data of the client systems 20m, 20n. Using extraction instructions EA2, it is communicated to the second extraction node EK2 which data are to be extracted from the source data.

In the specific example of an IT infrastructure shown in FIG. 2, an associated second extraction node EK2 is provided for each client system 20m and 20n. Using the second extraction node EK2 (SF extraction), data are extracted from the client system 20n (sales force). Using the second extraction node EK2 (SN extraction), data are extracted from the client system 20m (ServiceNow). In this context, different extraction instructions EA2 adapted to the associated client systems may be made available to the two extraction nodes EK2.

The aforementioned runtime component RK is run on the server system. The runtime component controls and monitors the extraction nodes EK1, EK2, the transformation node TK and the storage nodes SK, these nodes being controlled in accordance with a set of control instructions. For each client system and for each instantiated application (these being described in greater detail below), a separate set of control instructions may be provided.

The runtime component RK sends control instructions, which prompt the associated nodes to run a particular task, to the individual nodes EK1, EK2, TK, SK. For example, the runtime component RK may send a second extraction node EK2 an extraction instruction EA2, by means of which the second extraction node EK2 is prompted to extract process data PD from the source data QD of the client system 20n (as shown for example in FIG. 2). The runtime component may also send a corresponding extraction instruction EA to the first extraction node EK1. By way of a transformation instruction TA, which sends the runtime component RK to the transformation node TK, the transformation node TK can be prompted to generate a process protocol PP from predetermined process data PD stored in the storage node SK and to pass the generated process protocol to the storage node SK for storage. Correspondingly, the storage node SK may also be controlled using a storage instruction (not shown in the drawings). The storage node SK can thus be prompted, using a storage instruction, to prepare a particular process protocol for a particular type of analysis.

It is advantageous if, using the control instructions, the runtime component is only enabled to process data in relation to a client system; in other words, using a control instruction, a node can only be prompted to process data of a particular client system. This can also be controlled using the runtime component.

The control instructions themselves thus define how process protocols are generated from the source data stored in different client systems and how the source data of the different client systems can be accessed.

The runtime component RK advantageously controls the entire sequence from the extraction of the process data PD from the source data QD to the creation and storage of the associated process protocols PP.

The sequence of the method from the extraction of the process data PD from the source data QD to the creation and storage of the associated process protocols PP is summarized hereinafter:

In a first step, the extraction node EK1 or EK2 is prompted to extract process data PD from the source data of a particular client system and to pass the extracted process data to the storage node SK. The extraction of the process data PD is controlled by the runtime component RK using one or more extraction instructions EA, EA2, which are sent to the associated extraction node.

The extraction node EK1 may for example be run on a client system if the server system does not have direct access to the source data or to the process data of this client system (as shown for example in FIG. 3). In this way, no interface that grants the server system access to the source data QD of the client system has to be provided on the client system. Access to the source data QD from which the process data PD are extracted takes place exclusively through the extraction node EK1 of the client system. Security of the data can thus be comprehensively ensured, since the extraction node EK1 only extracts from the source data, and transfers to the storage node SK of the server system, the data (process data) that are absolutely required for a process analysis by the server system.

If the extraction node EK1 is run on a client system, optimized communications protocols for the type of connection (for example unstable connection, low-bandwidth connection) and optimized exchange formats (for example packet size, compression) may moreover be used for the communication between the first extraction node EK1 and the storage node SK, and make a major improvement in extraction performance and reliability possible by comparison with direct access. As a result of the reduction in the comparatively required bandwidth and the storage space, considerable savings are also possible in operation.

In a second step, the storage node SK receives the extracted process data PD from the extraction node EK1, EK2 and stores them in a storage device assigned to the storage node. Optionally, the storage node SK may prepare the process data before storage or store them in a prepared form.

In a third step, the transformation node TK generates a process protocol PP from the process data PD stored in the storage node SK and passes the generated process protocol on to the storage node SK.

In a fourth step, the storage node SK receives the generated process protocol PP and stores it in the storage device as a predetermined data structure.

After the fourth step, the process protocol is available for evaluation by a process mining system.

The data of a client system, in other words the extracted process data, and the process protocols generated from these process data are preferably encrypted using a client-specific key so as to prevent access to these data by other client systems. So as to make it possible for the individual nodes to have corresponding access to the data, the runtime component may make the respectively required keys for decrypting the data available to the nodes. The keys themselves are managed by the runtime component RK.

In order for the first extraction node EK1 to be able to extract process data from the source data and pass the extracted process data to the storage node SK of the server system, it is provided that the first extraction node EK1 registers with the runtime component RK. As a result of this registration, the runtime component knows which specific first extraction node EK1 is involved, to which client system this extraction node is assigned, and which extraction instructions can potentially be sent to this extraction node. The sequence for this is as follows:

The first extraction node EK1 or the program representing the first extraction node EK1 is installed on the corresponding client system 20a.

The program generates a key, which is transferred to the runtime component and stored therein.

The runtime component generates, for this first extraction node, a registration URL by means of which the first extraction node registers on the server system.

The first extraction node EK1 is now available for the server system or in the cluster, and can be used by the runtime component. Technically speaking, the runtime component does not communicate directly with the first extraction node, but rather queries a cluster address. The cluster manager of the server system subsequently coordinates the data transfer between the server system and the first extraction node.

So as to achieve scalability of the server system, it may be provided to use a plurality of second extraction nodes EK2, a plurality of transformation nodes TK and a plurality of storage nodes SK in the server system and to add further second extraction nodes EK2, transformation nodes TK and storage nodes SK to the server system as required. In this context, it may be advantageous to store the process data and process protocols in different storage nodes and to provide different transformation nodes for generating different process protocols. In this case, the runtime component may be adapted to address a corresponding node in each case for carrying out a method according to the invention; in other words, the runtime component may assign a client system one or more extraction nodes, transformation nodes and storage nodes that are to be used for processing the data of this client system. The runtime component can subsequently send the corresponding control instructions to these nodes. This means that the runtime component can distribute the individual steps of the method explained above over the associated nodes automatically.

If a plurality of extraction nodes, transformation nodes and storage nodes are present, the control instructions themselves define how, and by means of which nodes, process protocols are generated from the source data stored in different client systems.

According to the invention and as a central part of a method, an application catalogue, by means of which a number of applications are managed, is provided in the server system. These applications are also referred to as mining apps hereinafter.

Each application or mining app consists of an installation program and associated configuration data. Using the installation programs, mining apps can be instantiated for each client system and run on the server system. The mining apps instantiated for the client systems are managed by the runtime component. The configuration data comprise information on which control instructions are to be run on which nodes or which steps of the method according to the invention are to be run on which node for which client system. By way of the registration of the first extraction nodes, these extraction nodes are also known to and can be used by the associated mining apps. By way of the instantiated mining apps, which are assigned to a client system, the extraction nodes EK1, EK2, the transformation nodes TK and the storage nodes SK are controlled and monitored.

Because each mining app is assigned to a specific client system, the control instructions are also assigned to the associated client systems. In this way, different extraction instructions may be provided for example for a first client system than for a second client system.

In the specific example shown in FIG. 2, the mining app APP(SF) is run. This mining app APP(SF) is assigned to the client system 20n, and can accordingly make extraction instructions EA2 available to the second extraction node EK2 (SF extraction) that are adapted to the client system 20n. Accordingly, the mining app APP(SF) can make transformation instructions TA available to the transformation node TK that are adapted to transform process data PD extracted from the client system 20n. The same applies to the client system 20m; in other words, a mining app adapted accordingly to this client system is run.

In the specific example shown in FIG. 3, the mining app APP(SAP) is run. This mining app APP(SAP) is assigned to the client system 20a (to which the server system does not have direct access), and can accordingly make extraction instructions EA available to the first extraction node EK1 run on the client system 20a that are adapted to the client system 20a. Accordingly, the mining app APP(SAP) can make transformation instructions TA available to the transformation node TK that are adapted to transform the process data PD extracted from the client system 20a.

Using the distributed infrastructure according to the invention or a method according to the invention, it is possible for a server system to extract process data from different client systems and to create process protocols from the extracted process data, even if the server system does not have direct access to the source data of a client system. In this context, it is ensured that process data and process protocols can only be accessed by the respectively authorized client systems.

Further, the complete infrastructure can be expanded by additional extraction nodes, which are controlled by corresponding mining apps so as to extract process data, to which the infrastructure otherwise has no access, from source data. In addition, the infrastructure can be scaled as desired by adding additional transformation nodes, extraction nodes and storage nodes.

It is particularly advantageous in this context that the infrastructure can be expanded with additional client systems in a particularly simple manner. The additional client system merely requires a corresponding extraction node, and on the server system a corresponding mining app merely has to be instantiated and configured for this additional client system.

By means of the application catalog, mining apps can be added to the server system (by instantiating the corresponding mining app) and run there for each client system, without the application catalog having to be adapted for each client system. Using configuration data, each mining app instance can be adapted to the associated client system.

A method is thus provided with which a server system, in particular a cloud system, can be used particularly efficiently and with which maximum data security is ensured. It is thus possible, for example, for a specific client system to be assigned specific extraction nodes, transformation nodes and storage nodes, which can be used exclusively for generating the process protocols of this client system. This ensures that the individual nodes exclusively process data that originate from this client system. In addition, the server system can thus be used more efficiently, since only the nodes that are currently required have to be run; in other words, the corresponding resources in the server system only have to be reserved for the nodes that are to be run.

A method according to the invention has been described herein with reference to one or more client systems in which the source data from which the process data are extracted are stored.

A client system may comprise a plurality of computer systems, each client system being assigned to a company or customer.

REFERENCE SIGNS

10 Server system (for example cloud or cloud computing system)
20a . . . 20m, 20n Client systems
EA Extraction instructions (control instructions)
EA2 Extraction instructions (control instructions)
EK1 First extraction node (run on the client system)
EK2 First extraction node (run on the server system)
PD Process data
PP Process protocols
QD Source data
SK Storage nodes (plurality)
TA Transformation instruction (control instructions)
TK Transformation nodes (plurality)

What is claimed is:

1. A method for generating process protocols from process data in an IT system with at least one extraction node, at least one storage node, and at least one transformation node, said process data being stored in at least one client system of the IT system, wherein:
an application catalog is run on a server system of the IT system, and
a number of application templates are managed using the application catalog, each application template comprising an installation program and configuration data, wherein
the installation program is used to instantiate, configure, and run each application template on the server system as an application,
the applications being run are monitored and managed by a runtime component which is run on the server system, and
the process protocols are ascertained from the process data according to a number of control instructions which are run on the at least one extraction node, the at least one storage node, and the at least one transformation node, the configuration data of each application comprising information on which control instructions are run on which of the at least one extraction node, the at least one storage node, or the at least one transformation node.

2. The method of claim 1, wherein the at least one client system is connected to the server system via a communications network, and wherein the process data are generated by running at least one process in the at least one client system and are stored in the client system, and are a part of source data stored in the client system, the process data comprising data of a number of process instances, the data of a process instance representing a process that is run on the client system and that comprises a number of process steps.

3. The method of claim 2, wherein:
a first extraction node is run on at least one client system, at least one transformation node and at least one storage node are run on the server system,
the first extraction node extracts the process data from the source data stored in the client system in accordance with the control instructions and transfers the extracted process data to the storage node of the server system,
the storage node receives the extracted process data from the extraction node and stores them in a storage device of the server system, and
the transformation node generates the process protocol from the process data stored in the storage device in accordance with the control instructions and transfers the generated process protocol to the storage nodes for storage in the storage device.

4. The method of claim 3, wherein the first extraction node specifies which communications protocol is used for transferring the extracted process data to the storage node of the server system.

5. The method of claim 3, wherein the first extraction node prepares, in particular optimizes and/or compresses, the extracted process data before the extracted process data are transferred to the storage node of the server system.

6. The method of claim 3, wherein the extracted process data and the process protocols are distributed over a plurality of storage nodes.

7. The method of claim 3, wherein the transformation node generates the process protocol in accordance with a predetermined data structure, the predetermined data structure comprising at least:
a first attribute, in which a unique identifier of the process instance of the associated process step is stored,
a second attribute, in which an identifier of the associated process step is stored, and
a third attribute, in which an order of the process steps within a process instance is stored, wherein, in the data structure, the storage node stores the process steps associated with a process instance in the storage device, sorted by the third attribute.

8. The method of claim 7, wherein the process steps associated with a process instance are stored in the storage device at adjacent addresses, sorted by the third attribute.

9. The method of claim 3, wherein the control instructions comprise at least one extraction instruction that is sent to the first extraction node by the runtime component, the at least one extraction instruction prompting the first extraction node to extract predetermined process data from the source data and to transfer the extracted process data to the storage node of the server system.

10. The method of claim 3, wherein the first extraction node is to register itself with the runtime component in such a way that the runtime component can uniquely assign the registered first extraction node to a client system.

11. The method of claim 10, wherein at least one second extraction node is run on the server system, and extracts process data from the source data stored in the at least one client system in accordance with the at least one extraction instruction sent from the runtime component to the second extraction node and transfers the extracted process data to the storage node of the server system.

12. The method of claim 11, wherein the runtime component sends the at least one extraction instruction to the first extraction node or to the second extraction node as a function of the associated client system in which the source data are stored.

13. The method of claim 3, wherein the extracted process data and the process protocols are each encrypted using a key assigned to the associated client system, the key being generated when the application is configured for the associated client system.

14. The method of claim 3, wherein the control instructions comprise at least one transformation instruction, which is sent from the runtime component to the at least one transformation node, the at least one transformation instruction prompting the associated transformation node to generate the process protocol from predetermined process data.

15. The method of claim 14, wherein the at least one transformation instruction is run on a plurality of transformation nodes in parallel.

16. The method of claim 2, wherein the server system is usable jointly by a plurality of client systems.

* * * * *